United States Patent [19]
Rank et al.

[11] Patent Number: 5,588,216
[45] Date of Patent: Dec. 31, 1996

[54] GAS TANK GRAPHIC POSITIONING FIXTURE

[75] Inventors: David B. Rank, Waukesha, Wis.; Randall A. Bonebrake, Red Loin; Spurgeon C. Stoner, York, both of Pa.

[73] Assignee: Harley-Davidson Motor Company, Milwaukee, Wis.

[21] Appl. No.: 444,999

[22] Filed: May 19, 1995

[51] Int. Cl.⁶ .......................... G01B 11/27; G03B 21/00
[52] U.S. Cl. .................. 33/286; 33/549; 33/DIG. 21; 353/28
[58] Field of Search .............. 33/286, 288, DIG. 21, 33/533, 600, 645, 653, 549; 353/28

[56] References Cited

U.S. PATENT DOCUMENTS

| | | | |
|---|---|---|---|
| 3,803,720 | 4/1974 | Helava | 33/228 |
| 4,383,373 | 5/1983 | Couturier | 33/645 |
| 4,514,063 | 4/1985 | Wang et al. | 353/28 |
| 4,598,481 | 7/1986 | Donahue | 33/DIG. 21 |
| 4,630,379 | 12/1986 | Wickmann et al. | 33/288 |
| 4,691,443 | 9/1987 | Hamilton et al. | 33/288 |
| 4,910,541 | 3/1990 | Morgan | 353/28 |
| 5,072,680 | 12/1991 | Nakashima | 353/28 |
| 5,195,451 | 3/1993 | Nakashima | 353/28 |
| 5,341,183 | 8/1994 | Dorsey-Palmateer | 353/28 |
| 5,430,662 | 7/1995 | Ahonen | 353/28 |

*Primary Examiner*—Christopher W. Fulton
*Attorney, Agent, or Firm*—Michael, Best & Friedrich

[57] ABSTRACT

An alignment fixture and method including a support base, mounting brackets for supporting a part in a fixed position on the base, first and second laser transmitters mounted on the base and oriented in a fixed position relative to the part for projecting laser beams defining intersecting registration lines on the part.

2 Claims, 1 Drawing Sheet

U.S. Patent  Dec. 31, 1996  5,588,216
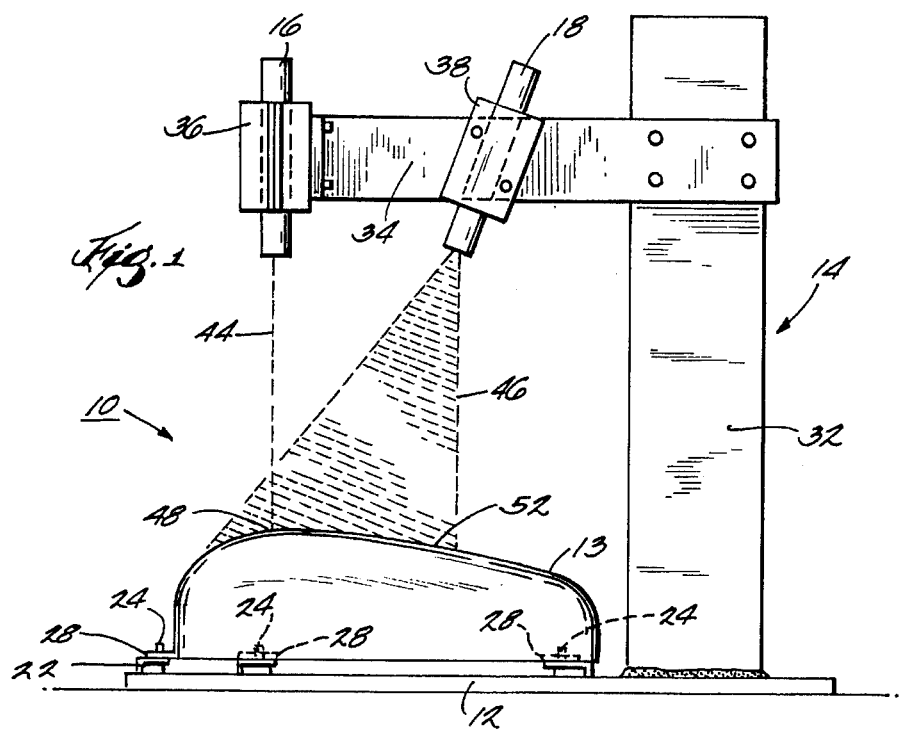
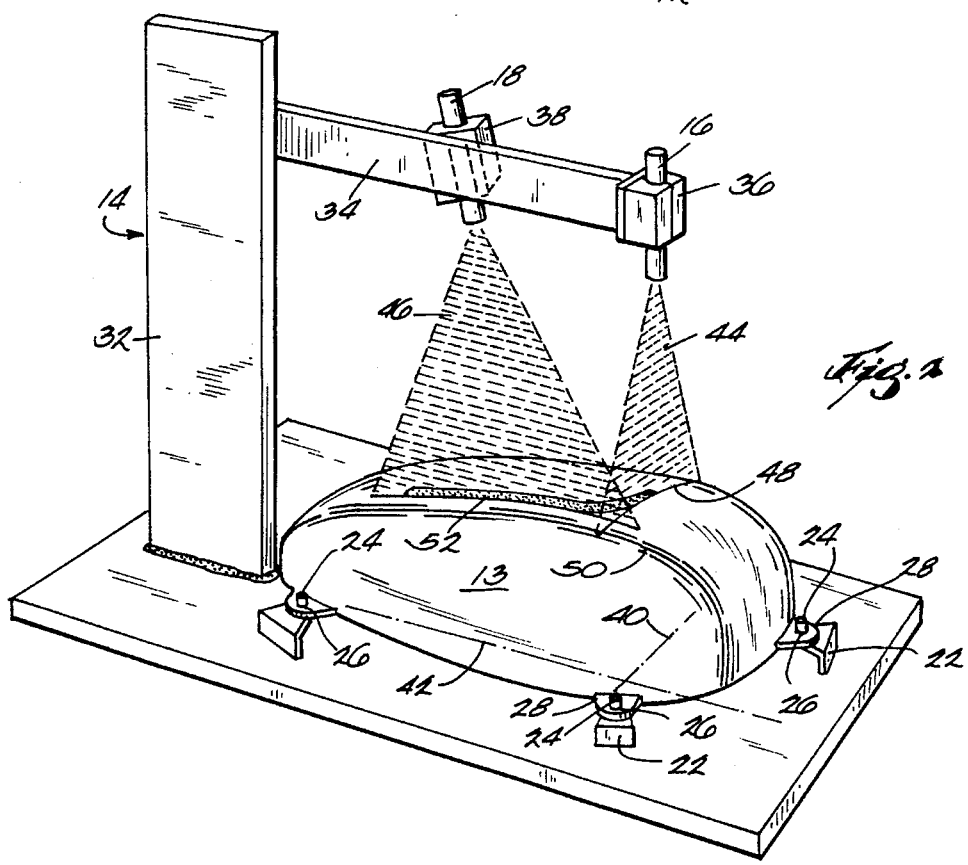

GAS TANK GRAPHIC POSITIONING FIXTURE

BACKGROUND OF THE INVENTION

This invention relates to alignment fixtures and more particularly, fixtures for aligning graphics on painted surfaces.

In the manufacture of complex components having painted surfaces, such as automobile quarter panels, motorcycle gas tanks and the like, it is common practice to apply graphics which must be properly aligned on a repeatable basis. Prior art methods of aligning such graphics included, for example, templates, magnetic and adhesive stencils, scribing, pens, pencils, paint and alignment fixtures. However, these methods were not wholly satisfactory because they required contact with the painted surfaces, were time consuming, and could not easily be conformed to variable part surfaces. Moreover, common methods such as scribing are difficult to see on a black or dark surface and are often covered by the graphics, such as decals.

SUMMARY OF THE INVENTION

It is an object of the invention to provide a new and improved fixture for properly aligning graphics on a painted surface.

Another object of the invention is to provide a method and fixture which provides reference marks on a painted surface without requiring physical contact with the part.

A further object of the invention is to provide a method and fixture for applying graphics to painted surfaces which are uneven.

Yet another object of the invention is to provide a method and apparatus for aligning graphics on a painted surface which is relatively rapid and easily repeatable.

A still further object of the invention is to provide a method of applying graphics to a painted surface wherein the graphical material does not cover the alignment marks.

These and other objects and advantages of the present invention will become more apparent from the detailed description thereof taken with the accompanying drawings.

In general terms, the invention comprises an alignment fixture having a support base, means for fixing a part in a fixed position on the base, at least one laser transmitter mounted on the base and oriented in a fixed position on the base relative to the part for projecting one or more laser beams onto the part in a pre-determined fixed pattern.

According to another of its aspects, the invention comprises a method of aligning graphic material on a part and including the step of mounting the part on a support, projecting first and second laser beams on the part in a predetermined pattern for defining a fixed alignment pattern on the part and applying the graphics material to the part in a fixed relation relative to the alignment pattern so that the graphics are aligned on a repeatable basis.

BRIEF DESCRIPTION OF THE DRAWINGS

FIG. 1 is a side elevational view of a graphics alignment fixture according to the invention; and FIG. 2 is a prospective view schematically illustrating the graphics pattern fixture FIG. 1.

DETAILED DESCRIPTION OF THE PREFERRED EMBODIMENT

The fixture 10 according to the preferred embodiment of the invention includes a support base 12 for supporting a part 13 to which the graphics is to be applied. Also mounted on the base 12 is a support assembly 14 for positioning a pair of laser transmitters 16 and 18 in a predetermined fixed position relative to the part 13.

The part 13 must be located in a predetermined position relative to the laser transmitters 16 and 18. Toward this end, a plurality of locating means are mounted on the base 12 and their location is dependent upon the configuration of the part to which the graphics is to be applied. In the illustrated example, the part consists of one-half of a motorcycle gas tank, although it will be appreciated that the invention has application to other parts as well, may have any convenient shape consistent with the part 13. In the illustrated embodiment, the support base 12 is a flat rectangular member and the anchoring means comprises a plurality of spaced brackets 22 each having an upwardly extending stud 24 positioned to extend through holes 26 in the mounting brackets 28 which are fixed to the tank half 13. It would be appreciated that for other parts, a different arrangement of the mounting means 20 would be required. Preferably, at least three brackets 20 are provided so that the tank half 13 is precisely located relative to the laser transmitters 16 and 18. In addition, the height of the brackets are proportioned such that the part 13 is oriented in a predetermined position relative to horizontal.

The support assembly 14 may take any convenient form which fixedly positions the laser transmitters relative to the part 13. Here, the assembly 14 is mounted at one side of the base 12 and includes a vertically extending support post 32 fixed at its lower end to one side of the base 12 and generally along the center line of the part 14. A support arm 34 extends perpendicularly from the post 32 and backwardly over the part 13. The support arm 34 includes a pair of spaced mounting assemblies, 36 and 38, for supporting the laser transmitter 16 and 18 in a fixed horizontal and angular position relative to the part 13. In the illustrated embodiment, the laser transmitters 16 and 18 and the arm 34 are fixed since the fixture 10 is dedicated to a specific part. However, the invention contemplates that the support arm 34, may be movable vertically or pivotable on the post 32 and the mounting assemblies 36 and 38 are movable longitudinally along the arm 34 and support the laser transmitters 16 and 18 for angular adjustment.

The laser projectors 16 and 18 are conventional and will not be discussed in detail for the sake of brevity. All that is necessary in order to understand applicant's invention is that the laser transmitters are constructed and arranged for projecting a concentrated beam and includes an interchangeable lens which produced the desired pattern on the target item. In this example each transmitter 16 and 18 projects a line when impacting base 12 or the part 13.

When the fixture 10 is first set up for the tank half 13, reference lines 44 and 46 are applied to the upper surface of the base 12 and positioned to be engaged by the beams from projectors 16 and 18 if the projectors are in proper alignment. This provides a visual check to the operator prior to positioning the part 13.

Once the part 13 is positioned, the laser transmitters 16 and 18 are activated to project light beams downwardly which upon impact with the part 13 produce light registration lines of 48 and 50 on the surface of the part 13. With the light registration lines 48 and 50 in position, the graphic material, such as a decal 52, can be accurately positioned on the contoured surface in a repeatable manner. The lasers are non-destructive, provide a relatively tight tolerance, are independent of the contour of the part and the graphics being used. Lasers are particularly suited for showing marks on black or dark parts where a scribe mark would be difficult to see. The method according to the invention is more rapid than prior art methods which require the application of a template, marking of the part, removing the template and applying the trim. In addition, because the laser beam is projected from above, application of the decal 52 does not cover the light registration lines 48 or 50 which would be the case with a scribe mark. Moreover, the use of lasers permits the application of the registration lines 48 or 50 without touching the cosmetic surface of the part 13.

The invention also contemplates an automated system in which the laser transmitters and a clamp for the part would be mounted on robot arms which would be controlled by a microprocessor which would receive coded data regarding the part such as from a bar code scanner, for example.

While only a single embodiment of the invention has been illustrated and described, it is not intended to be limited thereby, but only by the scope of the appended claims.

We claim:

1. A fixture for use in applying graphics to a part, said fixture having a support base, means mounted on said support base for fixing a part in a pre-determined fixed position on said base, said part fixing means including support means for supporting the part at three horizontally spaced apart locations for defining a fixed support plane for the part, a support member positioned horizontally above said support base, a pair of laser transmitters fixedly mounted on said support member in a horizontal spaced apart relation and vertically above said support base, said laser transmitters being constructed and arranged for projecting laser beams downwardly toward said base in planes, said laser transmitters being positioned such that said laser beams impact on a three dimensional part on said base as lines having a predetermined fixed alignment pattern whereby graphic material may be aligned on successive parts in an accurate repeatable basis.

2. A method of aligning graphic material on a part having a three dimensional surface, mounting the part on a support, positioning a pair of laser transmitters vertically above said part and in a fixed orientation relative thereto, orienting said laser transmitters so that each projects a laser beam in a plane so that the beams impact the three dimensional surface of the part as lines having a fixed alignment pattern, and applying graphic material to the part in a predetermined relation to the alignment pattern of the intersecting lines so that the graphic material may be aligned on successive parts in an accurate repeatable basis.

* * * * *